(12) United States Patent
Lin et al.

(10) Patent No.: US 7,756,393 B2
(45) Date of Patent: Jul. 13, 2010

(54) FRAME ADVANCE AND SLIDE SHOW TRICK MODES

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 939 days.

(21) Appl. No.: 10/493,348

(22) PCT Filed: Oct. 22, 2002

(86) PCT No.: PCT/US02/33683

§ 371 (c)(1),
(2), (4) Date: Apr. 22, 2004

(87) PCT Pub. No.: WO03/036963

PCT Pub. Date: May 1, 2003

(65) Prior Publication Data

US 2004/0190866 A1    Sep. 30, 2004

Related U.S. Application Data

(60) Provisional application No. 60/334,914, filed on Oct. 23, 2001.

(51) Int. Cl.
*H04N 5/91* (2006.01)
(52) U.S. Cl. ............................................... 386/68
(58) Field of Classification Search ............... 386/68, 386/95, 125–126, 124, 46
See application file for complete search history.

(56) References Cited

U.S. PATENT DOCUMENTS

| | | | |
|---|---|---|---|
| 5,377,051 A | 12/1994 | Lane et al. | 360/33.1 |
| 6,192,186 B1* | 2/2001 | Murashima et al. | 386/68 |
| 6,487,642 B1* | 11/2002 | Duruoz et al. | 711/145 |
| 6,980,594 B2* | 12/2005 | Wang et al. | 375/240.12 |
| 6,980,732 B1* | 12/2005 | Suzuki | 386/68 |
| 2002/0015577 A1* | 2/2002 | Negishi et al. | 386/68 |
| 2002/0044761 A1* | 4/2002 | Takashima et al. | 386/68 |
| 2003/0077069 A1* | 4/2003 | Lin et al. | 386/68 |

FOREIGN PATENT DOCUMENTS

| | | |
|---|---|---|
| JP | 11-146339 A | 5/1999 |
| JP | 2000-041221 A | 2/2000 |
| JP | 2000-244929 A | 9/2000 |
| JP | 2001-028748 A | 1/2001 |

(Continued)

OTHER PUBLICATIONS

Rao, K., "Information Compression Technique for Digital Broadcasting and Internet," Jun. 10, 1999, pp. 162-164.

*Primary Examiner*—Thai Tran
*Assistant Examiner*—Tat Chio
(74) *Attorney, Agent, or Firm*—Robert D. Shedd; Robert B. Levy; Jorge Tony Villabon

(57) ABSTRACT

A method of performing a trick mode on a video signal includes the steps of receiving a trick mode command and repeating a picture in the video signal to form a trick mode video signal in response to the trick mode command. If the picture being repeated is a bi-directional predictive picture, then the method can limit the repeating step to a predetermined number of times.

23 Claims, 3 Drawing Sheets

FOREIGN PATENT DOCUMENTS

| | | |
|---|---|---|
| JP | 2001-502858 A | 2/2001 |
| JP | 2002-077815 A | 3/2003 |
| WO | 9613123 A1 | 5/1996 |
| WO | 98/02827 A1 | 1/1998 |
| WO | 9848573 A1 | 10/1998 |

* cited by examiner

FRAME ADVANCE AND SLIDE SHOW TRICK MODES

This application claims the benefit under 35 U.S.C. 365 of International Application PCT/US02/33683, filed Oct. 22, 2002, which claims the benefit of U.S. Provisional Application No. 60/334,914, filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as a digital video disc (DVD) recorder or player, for purposes of viewing previously recorded programs or recording their favorite programs. Notably, the combination of a DTV (or an HDTV) and a digital video recorder or player can be an integral part of a home theater entertainment system.

A digital video recorder or player typically contains an MPEG decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder's or player's MPEG decoder before being displayed on the conventional television. Significantly, however, many DTV's contain their own MPEG decoders, as the MPEG decoder in the majority of digital video recorders or players cannot handle the decoding of video signals for such televisions. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, it is very difficult to perform trick modes in this type of arrangement. For example, oftentimes, a trick mode involves repeating a number of pictures in a video signal. As the bandwidth between the digital recorder and the DTV is limited, repeating pictures in the signal being fed to the DTV may cause the signal to exceed the maximum bit rate limit of the transmission channel. The problem is even more acute if the pictures are intra (I) pictures or predictive (P) pictures, as these pictures are generally encoded with more bits than the average picture.

Moreover, certain trick mode commands, such as a freeze or pause command, or a frame or field advance or slide show, can be problematic. Generally, a freeze command involves stopping and starting on a picture that may not necessarily be a precisely selected picture by the user. For example a product designer may elect to freeze only on a reference picture. A frame advance command is more precise in that every frame is frozen for a user selected time period. A varied form of frame advance known as a slide show is also precise in that every frame is frozen for a predetermined period. Each frame is displayed for a long, but known period of time. The slide show may also be thought of as a very slow forward trick mode. These trick modes may require the ability to freeze on each frame (or field) for an unlimited duration or for a duration not easily supported with MPEG techniques. The problem occurs, when an advance or slide show trick mode is initiated, there is no way to determine exactly how long the trick mode will remain in effect. Consequently, it is impossible to calculate how many times a particular picture will be displayed during this type of trick mode. This uncertainty can interfere with the display order of the pictures being transferred to the decoder in the DTV, as the DTV decoder is not under the control of the digital video recorder and has no way of knowing that a freeze, advance or slide show trick mode has been initiated. Moreover, even when the duration of such trick modes is predetermined, a trick mode utilizing a repeating B-frame can still cause errors relating to picture sequencing by the decoder. Thus, a need exists for a method and system for overcoming the limitations described above without increasing system costs or complexity.

SUMMARY OF THE INVENTION

The present invention concerns a method of performing a trick mode on a video signal. The method comprises the steps of receiving a trick mode command, repeating a picture in the video signal to form a trick mode video signal in response to the trick mode command, determining if the picture being repeated is a bi-directional predictive picture, and limiting the repeating step to a predetermined number of times if the picture being repeated is a bi-directional predictive picture.

In another aspect of the present invention, a method of performing a trick mode on a video signal comprises the steps of receiving an advance trick mode command and repeating a bi-directional predictive picture in the video signal to form a trick mode video signal in response to the advance trick mode command, wherein the bi-directional predictive picture contains a display indicator having a display indicator value. The method further comprises the step of setting the display indicator of the repeated bi-directional predictive picture to a predetermined value and setting the display indicator of a subsequent picture of the video signal to another predetermined value.

The invention also concerns a system for performing a trick mode on a video signal. The system comprises a controller and a processor for reading data from a storage medium and outputting the video signal. The processor is preferably programmed to receive a trick mode command (such as an advance trick mode command) and repeat a picture (such as a bi-directional predictive picture) in the video signal to form a trick mode video signal in response to the trick mode command, wherein the picture contains a display indicator. The processor can further be programmed to set the display indicator of the repeated picture to a value given to the original picture. Alternatively, the processor can be programmed to limit the number of times the bi-directional predictive picture is repeated to a predetermined number of times.

DETAILED DESCRIPTION OF THE PREFERRED EMBODIMENTS

Figure 1:
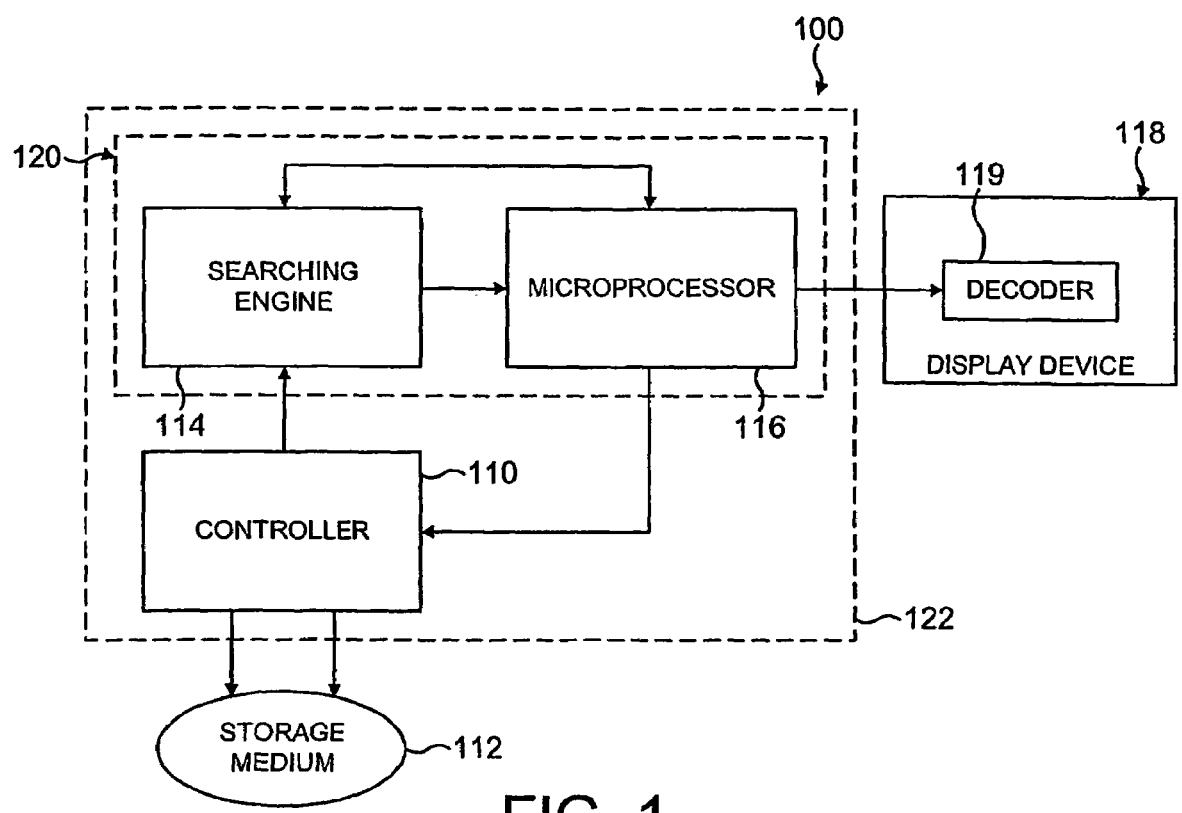
FIG. 1 is a block diagram of a system that can perform an advance or slide show trick mode in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a video processor 120 within contemplation of the present invention. Further, all or portions of the controller 110, the searching engine 114 and the microprocessor 116 can be a bitstream source 122 within contemplation of the present invention. In one arrangement, the display device 118 can contain its own decoder 119 for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement, and the decoder 119 in the display device 118 can be referred to as a remote decoder. It should be noted, however, that the invention is not limited to this arrangement, as the invention can be practiced in other suitable systems.

In operation, the controller 110 can read a video signal containing a plurality of digitally encoded pictures from the storage medium 112. In one arrangement, if the microprocessor 116 receives a trick mode command, then the microprocessor 116 can repeatedly transmit a picture in the video signal to the decoder 119 thereby forming a trick mode video signal. The microprocessor 116 can execute the repeating step by transmitting repeats or duplicates of the picture to be repeated. These duplicates of the picture to be repeated during the trick mode can be referred to as subsequent repeated pictures. In one aspect of the invention, the picture to be repeated can be a bi-directional predictive (B) picture, and the trick mode can be an advance trick mode (such as frame or field advance) or a slide show trick mode.

During the trick mode, the picture being repeated can be repeatedly displayed (through the use of the subsequent repeated pictures) at the display device 118. In addition, this picture and the subsequent repeated pictures can include a display indicator, which is typically used to enable the decoder 119 to determine when a picture is to be displayed, at least relative to other pictures in a video signal. In one arrangement, the microprocessor 116 can set the display indicator of the picture to be repeated and the subsequent repeated pictures to a predetermined value to reflect an intended display order. This predetermined value of the display indicator of the picture being repeated can be the same as the predetermined value of the display indicators of the subsequent repeated pictures. The display indicator of a picture can be a temporal reference field. In addition, the microprocessor 116 can set to a predetermined value the display indicators of any reference frames that may be used to predict the picture to be repeated during the trick mode. Further-more, if a bi-directional predictive picture (B-Picture) is to be repeated during the trick mode, then special considerations are involved as explained below. Generally, though, a remote decoder in accordance with one aspect of the present invention should be able to handle repeating pictures. Some remote decoders may require that a subsequent repeating picture must have a higher temporal reference field than a preceding repeated picture. In such instances, an alternative embodiment of the present invention utilizing repeated pictures with increasing temporal reference fields (or display indicators) may be more suitable. The overall operation of the invention will be discussed in greater detail below.

Performing Trick Mode On Bidirectional Predictive Frames

Figure 2:
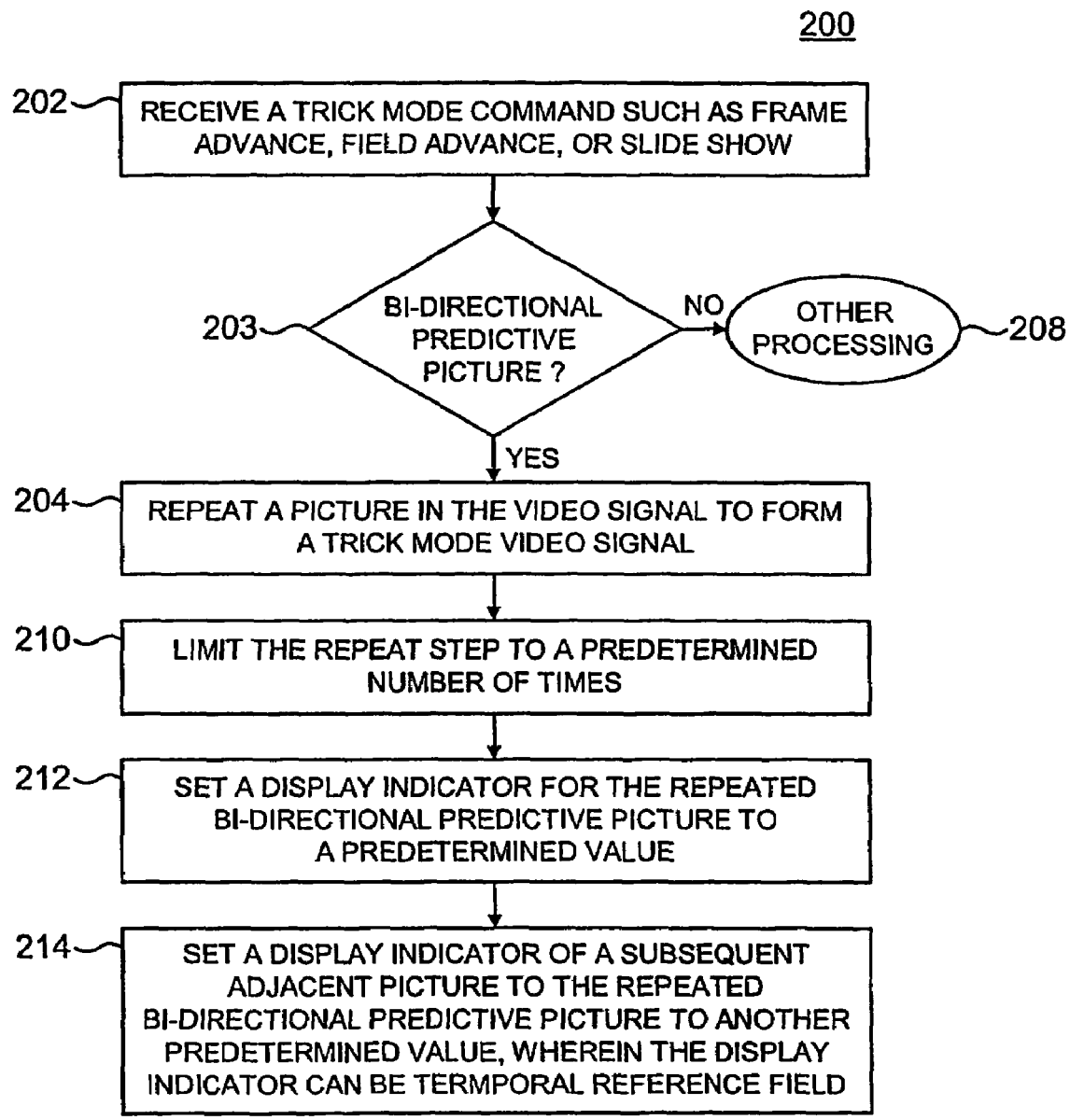
FIG. 2 is a flow chart that illustrates an operation of a method of performing an advance or slide show trick mode in accordance with the inventive arrangements.

FIG. 2 illustrates a flowchart 200 that demonstrates one way in which a trick mode on B pictures can be executed. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder, such as a digital video player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 202, a trick mode command can be received. In one arrangement, the trick mode command can be a frame advance, a field advance (utilizing field pictures), or a slide show trick mode command. For purposes of the invention, a frame advance, a field advance, or a slide show trick mode can be a trick mode in which a particular picture in the video signal can be repeatedly displayed on a display device for an amount of time determined by a viewer. Although the invention is discussed primarily in terms of an advance or slide show trick mode, it must be noted that the invention can be practiced with any other suitable trick mode. At decision block 203, it is determined if the picture to be repeated is a B-Picture. Once the trick mode command is received, at step 204, a picture in the video signal can be repeated to form a trick mode video signal. If the picture to be repeated is not a B-Picture, then other processing can be done to the pictures at step 208.

In one arrangement and as noted earlier, if the picture to be repeated is a B picture at decision block 203, the repeats or duplicates of this picture (referred to as subsequent repeated pictures) can be limited to a predetermined number of repeats. Preferably, the predetermined number of repeat frames is set to a maximum number of pictures allowed in a group of pictures for a given standard. For example, the predetermined number can be set to 1023 (or 34 seconds) when a prediction distance is equal to 2 (M=2) or 511 (or 17 seconds) when the prediction distance is equal to 3 (M=3) where the frame rate is 30 frames per second. Without these limits in place, it is otherwise recommended that the frame advance trick mode only use anchor frames or reference frames such as I or P pictures. In addition, the picture to be repeated and the subsequent repeated pictures can include a display indicator. In the case where the present invention has repeated pictures with an increasing display indicator or temporal reference field, it is preferable to limit the display indictor in the last picture in a group of pictures (GOP) to the maximum number of pictures allowed in a GOP and to make any other necessary adjustments to temporal reference fields in other pictures in the GOP to avoid violating a particular decoder's parameters. For example, a decoder may require that a Bi-directional predictive picture received must have a temporal reference field between the last two temporal reference fields and/or that the temporal reference field of the Bi-directional predictive picture received has a lower value than the picture preceding the Bi-directional predictive picture received. In a slow motion trick mode in a scenario where temporal reference field values are not allowed to repeat, in accordance with another aspect of the invention, every picture in a GOP can be repeated for the same amount and the repeated amount can be limited by the maximum number of pictures allowed in a GOP (1023, for example) divided by the number (N) of pictures in the GOP, for example, 1023/N.

At step 212, the display indicator of the repeated picture can optionally be set to a predetermined value such as the display indicator value of the original picture being repeated. At step 214, the display indicators of subsequent repeated pictures of the picture being repeated can optionally be set to another predetermined value such as 1023. As such, the value of the display indicator for each of the pictures to be displayed during the trick mode can be the same or can increment up to 1022 for example. As previously mentioned, the display indicator can be a temporal reference field. A temporal reference field is typically a ten bit field located in the picture header of digitally encoded pictures. This field normally has an integer value, and some decoders rely on this value to determine when a picture is to be displayed. The invention, however, is not limited in this regard, as other suitable display indicators can be used to reflect an intended display order.

Figure 3:
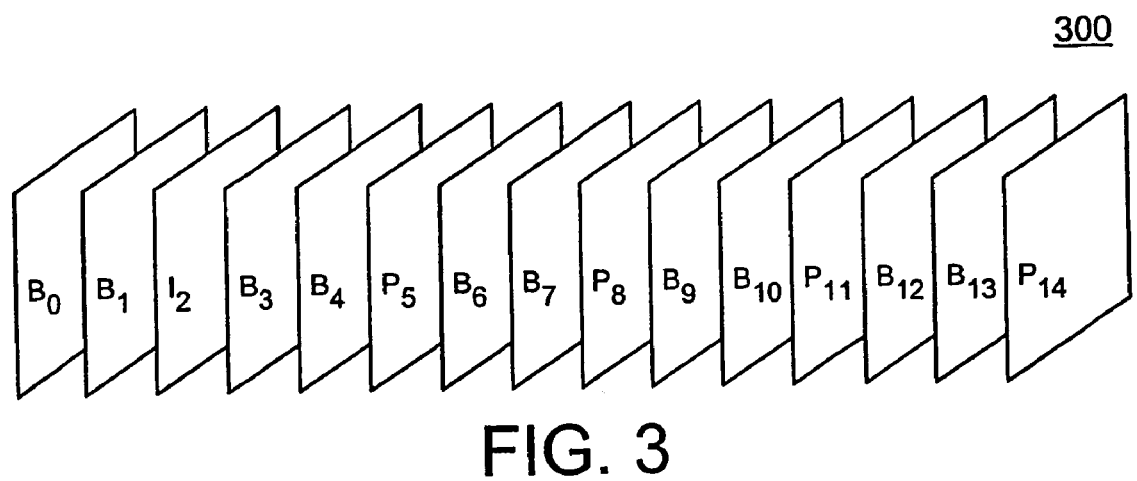
FIG. 3 shows a typical group of pictures structure in display order.

An example of the process described in steps 210-214 is discussed below. Referring to FIG. 3, a typical group of pictures (GOP) structure 300 in display order is shown. The GOP can include B pictures, predictive (P) pictures and intra (I) pictures. The subscript numbers represent integer values of each picture's temporal reference field and can indicate when a particular picture will be displayed relative to the other pictures in the GOP, at least during normal playback. For instance, the first picture in the GOP, $B_0$, will be displayed first followed by $B_1$, $I_2$ and so on. Those skilled in the art will appreciate that the invention is not limited to use on this particular type of GOP and that the integer values of the temporal reference fields are not limited to these particular values.

As is known in the art, when transmitting a B picture for decoding and display, the two reference pictures from which the B picture is predicted must be sent to the decoder and decoded before the B picture. Once the reference pictures are decoded, the B picture can be decoded, and the pictures are displayed according to their display order, which can be obtained from the integer values of the temporal reference fields. As an example, if the reference pictures are P pictures $P_5$ and $P_8$ and the B picture $B_6$ is to be decoded and displayed, then $P_5$ and $P_8$ are decoded first followed by $B_6$; however, the display order is as follows: $P_5$, $B_6$ and $P_8$ (for convenience, this example ignores picture $B_7$).

Continuing with this example, to reflect the intended display order, the integer value of the temporal reference field of picture $P_5$ can be set to a predetermined value of 5, the integer value of the temporal reference field of picture $B_6$ can be set to 6 and the integer value of the temporal reference field of picture $P_8$ can be set to 8. As the reference pictures are transmitted to the decoder and decoded prior to picture $B_6$, however, the value of the temporal reference fields of the reference pictures are set before the value of the temporal reference field of picture $B_6$.

Such a process can be problematic if a freeze-related trick mode is to be performed on picture $B_6$ (or any other B picture for that matter) such as an advance trick mode or slide show trick mode. Specifically, as picture $B_6$ is repeated, the value of the temporal reference fields of each of the subsequent repeated pictures is set to reflect their intended display order. Thus, the value of the temporal reference fields of subsequent repeated pictures of picture $B_6$ are typically incrementally increased during the freeze-related trick mode. As noted earlier, however, the integer value of the temporal reference field of reference picture $P_8$ will remain the same, and once the freeze-related trick mode is stopped, picture $P_8$ may be displayed out of order as the decoder, particularly if it is remotely located, is unaware that a trick mode has been initiated.

In accordance with the inventive arrangements, however, the integer value of picture $B_6$ can be set to 6, and the integer values of the temporal reference fields of subsequent repeated pictures of picture $B_6$ can also be set to a value of 6 or can be incremented up to a predetermined value.

Although the present invention has been described in conjunction with the embodiments disclosed herein, it should be understood that the foregoing description is intended to illustrate and not limit the scope of the invention as defined by the claims.

The invention claimed is:

1. A method of performing a trick mode on a video signal, comprising the steps of:
   in response to a trick mode command, repeating a picture in a group of pictures in the video signal to form a trick mode video signal by a processor;
   determining whether to impose an upper limit on said repeating step, based on a picture type of the picture being repeated, by determining if the picture being repeated is a bi-directional predictive picture; and
   selectively limiting the repeating step to a predetermined number of times up to a maximum number of pictures allowed in the group of pictures for a given standard only if the picture being repeated is a bi-directional predictive picture.

2. The method according to claim 1, wherein the trick mode comprises a frame advance trick mode.

3. The method according to claim 1, wherein the method further comprises the step of setting a display indicator of a subsequent adjacent picture to the repeated bi-directional predictive picture to a predetermined value limited to the maximum number of pictures allowed in the group of pictures.

4. The method according to claim 1, wherein the display indicator comprises a temporal reference field having an integer value.

5. The method according to claim 1, wherein the trick mode comprises a slide show trick mode.

6. The method according to claim 1, wherein the trick mode comprises a field advance trick mode, and wherein each field in the picture is repeatedly displayed until a subsequent field is decoded.

7. The method according to claim 1, wherein at least a portion of the trick mode video signal is decoded by a remote decoder.

8. The method according to claim 1, wherein the method further comprises the step of successively increasing a temporal reference field for each of the pictures being repeated and limiting the temporal reference field of a last picture in a group of pictures to a maximum number allowed in a group of pictures for a given standard.

9. The method according to claim 1, wherein the method further comprises the step of setting a temporal reference field of the picture being repeated to a value of a temporal reference field for the picture.

10. A method of performing a trick mode on a video signal, comprising the steps of:
in response to an advance trick mode command, repeating a bidirectional predictive picture in a group of pictures in the video signal to form a trick mode video signal by a processor, wherein the bidirectional predictive picture contains a display indicator having a display indicator value;
determining whether to impose an upper limit on said repeating step, based on a picture type of the picture being repeated, by determining if the picture being repeated is a bi-directional predictive picture
selectively limiting the repeating step to a predetermined number of times up to a maximum number of pictures allowed in the group of pictures for a given standard only if the picture being repeated is a bidirectional predictive picture; and
setting the display indicator of the repeated bidirectional predictive picture to the display indicator value.

11. The method according to claim 10, wherein at least a portion of the trick mode video signal is decoded by a remote decoder.

12. The method according to claim 10, wherein a last picture in a group of pictures of the video signal is set to the maximum number allowed in a group of pictures for a given standard.

13. The method according to claim 10, wherein the advance trick mode command comprises a frame advance trick mode command requiring a repeat of at least one bi-directional predictive frame picture.

14. The method according to claim 10, wherein the advance trick mode command comprises a field advance trick mode command requiring a repeat of at least one bi-directional predictive field picture.

15. A system for performing a trick mode on a video signal, comprising:
a controller for reading data from a storage medium and outputting the video signal; and
a processor programmed to:
receive a trick mode command;
in response to the advance trick mode command, repeat a bi-directional picture of an original bi-directional picture in a group of pictures in the video signal to form a trick mode video signal, wherein the picture contains a display indicator;
determine whether to impose an upper limit on said repeating step, based on a picture type of the picture being repeated, by determining if the picture being repeated is a bi-directional predictive picture
selectively limit the repeating of the bi-directional picture to a predetermined number of times up to a maximum number of pictures allowed in the group of pictures for a given standard only if the picture being repeated is a bidirectional predictive picture; and
set the display indicator of the repeated picture in the trick mode video signal to a value for the original bi-directional picture.

16. The system according to claim 15, wherein the processor is further programmed to set the display indicator of a subsequent picture of the video signal to the maximum value allowed for a group of pictures for a given standard.

17. The system according to claim 15, wherein the trick mode comprises an advance trick mode.

18. The system according to claim 15, wherein the picture to be repeated comprises a bidirectional predictive picture.

19. The system according to claim 15, wherein the display indicator comprises a temporal reference field having an integer value.

20. The system according to claim 16, wherein the advance trick mode is selected from the group of modes comprising a frame advance trick mode, a frame 3 slide show trick mode, a field advance trick mode and a field slide show trick mode.

21. The system according to claim 15, wherein at least a portion of the trick mode video signal is decoded by a remote decoder.

22. A system for performing a trick mode on a video signal, comprising:
a controller for reading data from a storage medium and outputting the video signal; and
a processor programmed to:
receive an advance trick mode command;
in response to the advance trick mode command, repeat a picture in a group of pictures in the video signal to form a trick mode video signal, wherein the picture contains a display indicator;
determine whether to impose an upper limit on a number of times the picture is repeated, based on a picture type of the picture, by determining if the picture is a bi-directional predictive picture; and
selectively limit the number of times the picture is repeated to a predetermined number of times up to a maximum number of pictures allowed in the group of pictures for a given standard only if the picture is a bi-directional predictive picture.

23. The system according to claim 22, further comprising a remote decoder for decoding at least a portion of the trick mode video signal.

* * * * *